(12) United States Patent
Alameh et al.

(10) Patent No.: US 10,331,223 B2
(45) Date of Patent: Jun. 25, 2019

(54) METHOD AND APPARATUS FOR SELECTING BETWEEN MULTIPLE GESTURE RECOGNITION SYSTEMS

(71) Applicant: Google Technology Holdings LLC, Mountain View, CA (US)

(72) Inventors: Rachid M. Alameh, Crystal Lake, IL (US); Patrick J. Cauwels, South Beloit, IL (US); David G. Fliszar, Oak Park, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 15/948,392

(22) Filed: Apr. 9, 2018

(65) Prior Publication Data

US 2018/0232058 A1    Aug. 16, 2018

Related U.S. Application Data

(63) Continuation of application No. 15/729,053, filed on Oct. 10, 2017, now Pat. No. 9,939,916, which is a
(Continued)

(51) Int. Cl.
*G06F 3/01* (2006.01)
*G06F 3/00* (2006.01)
*G06F 3/03* (2006.01)

(52) U.S. Cl.
CPC .............. *G06F 3/017* (2013.01); *G06F 3/005* (2013.01); *G06F 3/0304* (2013.01)

(58) Field of Classification Search
None
See application file for complete search history.

(56) References Cited

U.S. PATENT DOCUMENTS

2010/0104134 A1    4/2010  Wang et al.
2010/0321289 A1*  12/2010  Kim .................... G06F 1/1626
                                                          345/156
(Continued)

FOREIGN PATENT DOCUMENTS

WO    WO/2012/054060        4/2002

OTHER PUBLICATIONS

International Preliminary Report on Patentability and Written Opinion of the International Search Authority dated Jan. 28, 2016 in International Application No. PCT/US2014/046877.
(Continued)

*Primary Examiner* — Nicholas J Lee
(74) *Attorney, Agent, or Firm* — Byrne Poh LLP

(57) ABSTRACT

A method and apparatus for selecting between multiple gesture recognition systems includes an electronic device determining a context of operation for the electronic device that affects a gesture recognition function performed by the electronic device. The electronic device also selects, based on the context of operation, one of a plurality of gesture recognition systems in the electronic device as an active gesture recognition system for receiving gesturing input to perform the gesture recognition function, wherein the plurality of gesture recognition systems comprises an image-based gesture recognition system and a non-image-based gesture recognition system.

18 Claims, 7 Drawing Sheets

Related U.S. Application Data continuation of application No. 15/332,317, filed on Oct. 24, 2016, now Pat. No. 9,791,939, which is a continuation of application No. 14/073,113, filed on Nov. 6, 2013, now Pat. No. 9,477,314.

(60) Provisional application No. 61/846,754, filed on Jul. 16, 2013.

(56) References Cited

U.S. PATENT DOCUMENTS

| | | |
|---|---|---|
| 2011/0102570 A1* | 5/2011 | Wilf .................. G06F 3/017 348/77 |
| 2011/0310005 A1 | 12/2011 | Chen et al. |
| 2011/0314425 A1 | 12/2011 | Chiang |
| 2012/0016641 A1 | 1/2012 | Raffa et al. |
| 2012/0146903 A1 | 6/2012 | Arihara et al. |
| 2012/0200486 A1 | 8/2012 | Meinel et al. |
| 2013/0229508 A1 | 9/2013 | Li et al. |
| 2015/0109242 A1* | 4/2015 | Wei .................. G06F 3/044 345/174 |

OTHER PUBLICATIONS

International Search Report & Written Opinion of the International Search Authority dated Oct. 29, 2014 in International Patent Application No. PCT/US2014/046877.
Notice of Allowance dated Dec. 6, 2017 in U.S. Appl. No. 15/729,053.
Office Action dated Oct. 16, 2015 in U.S. Appl. No. 14/073,113.
Office Action dated Dec. 29, 2016 in U.S. Appl. No. 15/332,317.
Notice of Allowance dated May 16, 2016 in U.S. Appl. No. 14/073,113.
Notice of Allowance dated Jun. 16, 2017 in U.S. Appl. No. 15/332,317.

* cited by examiner

METHOD AND APPARATUS FOR SELECTING BETWEEN MULTIPLE GESTURE RECOGNITION SYSTEMS

CROSS-REFERENCE TO RELATED APPLICATION

This application is a continuation of U.S. patent application Ser. No. 15/729,053 filed on Oct. 10, 2017, which is a continuation of U.S. patent application Ser. No. 15/332,317, filed on Oct. 24, 2016, which is a continuation of U.S. patent application Ser. No. 14/073,113, filed on Nov. 6, 2013, which claims the benefit of U.S. Provisional Patent Application No. 61/846,754, filed on Jul. 16, 2013, each of which is hereby incorporated by reference herein in its entirety.

FIELD OF THE DISCLOSURE

The present disclosure relates generally to gesture recognition systems and more particularly to smart switching between gesture recognition systems.

BACKGROUND

Electronic devices, such as smartphones and tablet computers, continue to evolve through increasing levels of performance and functionality as manufacturers design products that offer consumers greater convenience and productivity. One area where performance gains have been realized is in gesture recognition technology. Electronic devices with integrated gesture recognition systems (GRSs) can be controlled without the need for tactile or touch input, which has distinct advantages.

Gesturing is much more natural than manipulating control structures, such as buttons, which can wear out, or touch screens, which are prone to smudging. GRSs allow for gloved operation and will also better accommodate the smaller form factors of next-generation devices. Currently, however, new innovation is still needed to overcome difficulties associated with the use of GRSs in electronic devices. Some GRSs, for example, can fail to adequately perform gesture recognition under certain contexts of operation.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
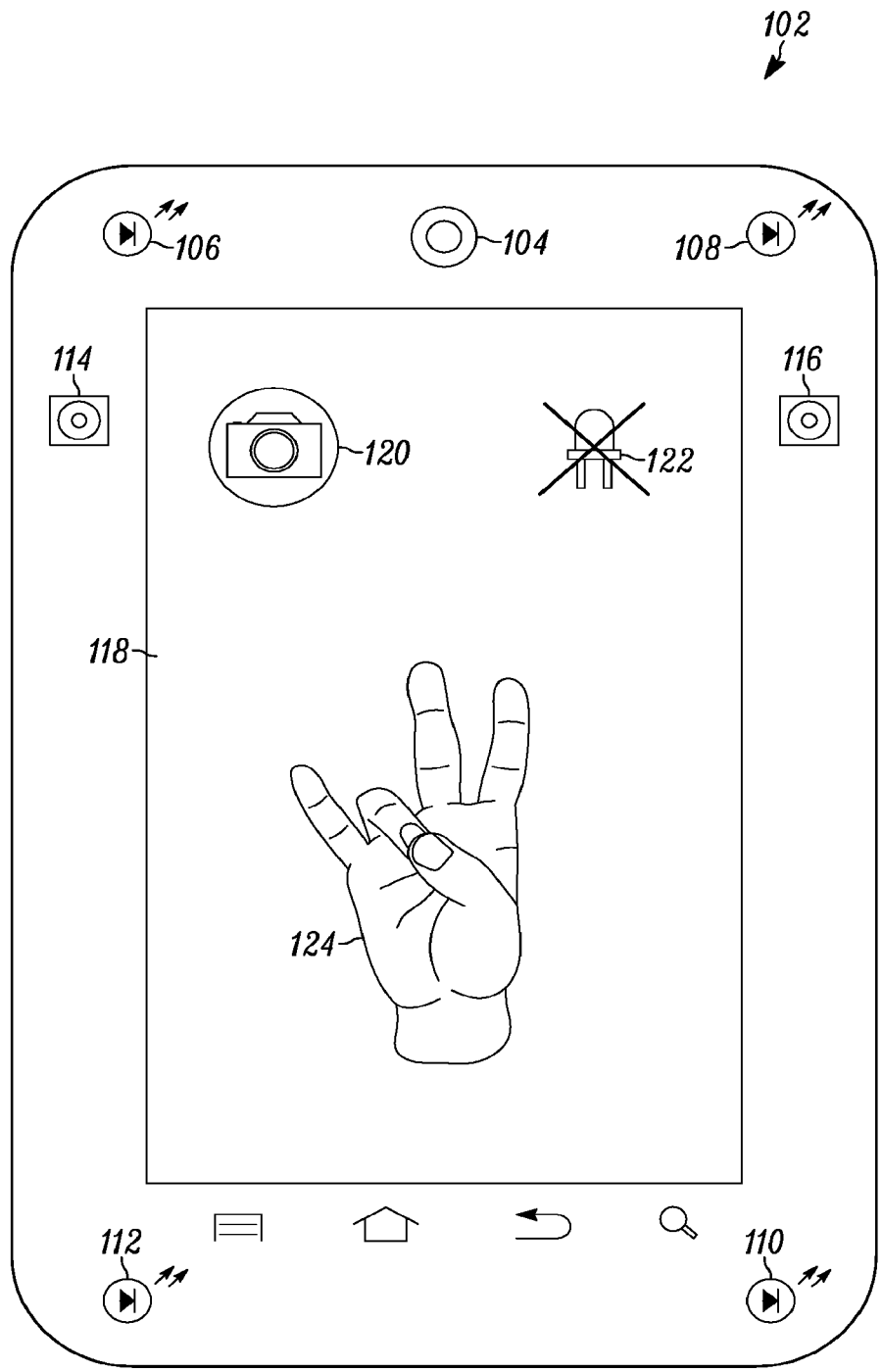
FIG. 1 is a schematic diagram of an electronic device in accordance with some embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and apparatus for selecting between multiple GRSs. An electronic device selects a GRS that achieves certain performance characteristics based on a context of operation for the device. In accordance with the teachings herein, a method performed by an electronic device for selecting a GRS includes: determining a context of operation for the electronic device that affects a gesture recognition function performed by the electronic device; and selecting, based on the context of operation, one of a plurality of GRSs in the electronic device as an active GRS for receiving gesturing input to perform the gesture recognition function, wherein the plurality of GRSs includes an image-based GRS and a non-image-based GRS.

Also in accordance with the teachings herein is an electronic device, configured to perform a gesture recognition function, having a plurality of GRSs including: an image-based GRS configured to receive first gesturing input using an imager to perform the gesture recognition function and a non-image-based GRS configured to receive second gesturing input without using an imager to perform the gesture recognition function. The electronic device further includes a processing element configured to select an active GRS from the plurality of GRSs, wherein the selecting is based on a context of operation for the electronic device that affects the gesture recognition function performed by at least one of the GRSs.

Referring now to the drawings, and in particular FIG. 1, an electronic device (also referred to herein simply as a "device") implementing embodiments in accordance with the present teachings is shown and indicated generally at 102. Specifically, device 102 represents a smartphone including: a camera 104, configured to capture images; four light-emitting diodes (LEDs) 106-112, configured to emit infrared light; a photodiode 114, configured to detect infrared light; a light meter 116, configured to detect an ambient light level; a user interface 118, capable of accepting tactile or touch input and displaying visual output; a first icon 120, configured to indicate and/or select an image-based GRS;

and a second icon 122, configured to indicate and/or select a non-image-based GRS. While a smartphone is shown at 102, no such restriction is intended or implied as to the type of device to which these teachings may be applied. Other suitable devices include, but are not limited to: personal digital assistants (PDAs); audio- and video-file players (e.g., MP3 players); personal computing devices, such as tablets; and wearable electronic devices, such as devices worn with a wristband. For purposes of these teachings, a device is any electronic apparatus that can select between multiple GRSs capable of performing a gesture recognition function.

Figure 2:
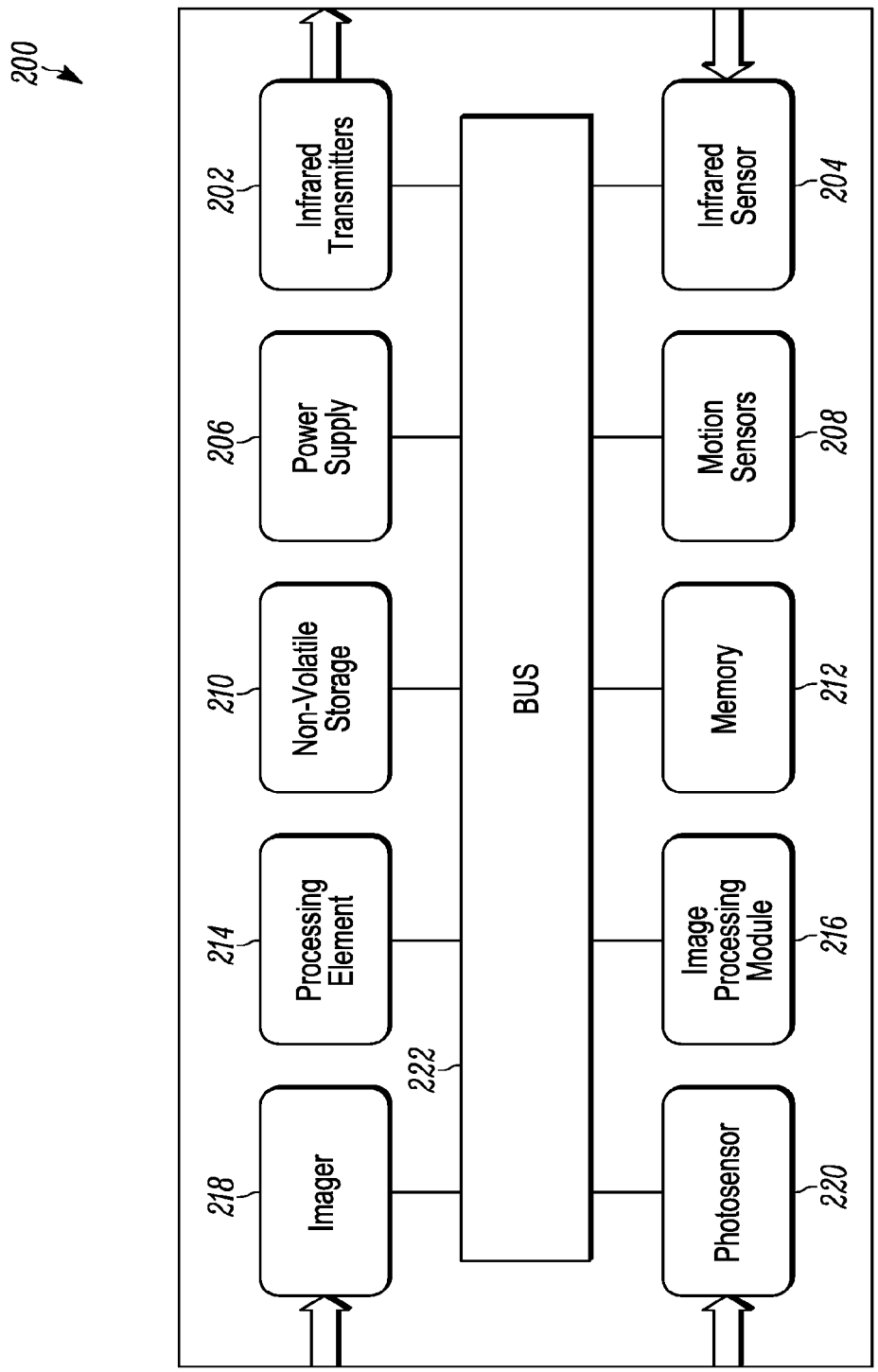
FIG. 2 is a block diagram of an electronic device configured for implementing embodiments in accordance with the present teachings.

Referring to FIG. 2, a block diagram for a device in accordance with embodiments of the present teachings is shown and indicated generally at 200. For one embodiment, the block diagram 200 represents the device 102. Specifically, the schematic diagram 200 shows: infrared transmitters 202, an infrared sensor 204, a power supply 206, motion sensors 208, non-volatile storage 210, memory 212, a processing element 214, an image processing module 216, an imager 218, and a photosensor 220, all operationally interconnected by a bus 222.

A limited number of device elements 202-222 are shown at 200 for ease of illustration, but other embodiments may include a lesser or greater number of such elements in a device. Moreover, other elements needed for a commercial embodiment of a device that incorporates the elements shown at 200 are omitted from FIG. 2 for clarity in describing the enclosed embodiments.

We now turn to a brief description of the elements within the schematic diagram 200. In general, the infrared transmitters 202, the infrared sensor 204, the processing element 214, the imager 218, and the photosensor 220 are configured with functionality in accordance with embodiments of the present disclosure as described in detail below with respect to the remaining figures. "Adapted," "operative," "capable" or "configured," as used herein, means that the indicated elements are implemented using one or more hardware devices, such as one or more operatively coupled processing cores, memory devices, and interfaces, which may or may not be programmed with software and/or firmware as the means for the indicated elements to implement their desired functionality. Such functionality is supported by the other hardware shown in FIG. 2, including the device elements 206, 208, 210, 212, 216, and 222.

Continuing with the brief description of the device elements shown at 200, as included within the device 102, the processing element 214 includes arithmetic logic and registers necessary to perform the digital processing required by the device 102 to process context data and select a GRS in a manner consistent with the embodiments described herein. For one embodiment, the processing element 214 represents a primary microprocessor of the device 102. For example, the processing element 214 can represent an application processor of the smartphone 102. In another embodiment, the processing element 214 is an ancillary processor, separate from a central processing unit (CPU), dedicated to providing the processing capability, in whole or in part, needed for the device elements 200 to perform their intended functionality.

The block element 202 represents a set of infrared transmitters. A "set," as used herein, refers to one or more objects. For a particular embodiment, the transmitters 202 are infrared LEDs, for example, the LEDs 106-112. In different embodiments, the transmitters 202 emit light of different frequencies, either within an infrared spectrum having wavelengths of between 700 nanometers and 1 millimeter, or outside the infrared spectrum. In further embodiments, the infrared transmitters 202 can emit omnidirectional light, or focus light in a particular direction. For one embodiment, a pattern of illumination represents a cone of light extending outward from each transmitter 202 such that the light intensity is greatest along the cone's central axis and falls off with increasing angular and radial displacement. For another embodiment, the light emitted by each transmitter is modulated with an embedded signal that distinguishes it from light emitted by the other transmitters.

The block element 204 represents an infrared sensor. For a particular embodiment, the sensor 204 is a photodiode, the photodiode 114, for example, which is sensitive to the particular frequency of light emitted by the transmitters 202. The photodiode 204 can be of the same or similar construction as the infrared LEDs 202, which in addition to emitting light, also produce a voltage difference across their leads when subjected to light. For some embodiments, the block element 204 represents multiple sensors, each configured to detect a frequency of light emitted by at least one of the transmitters 202. In further embodiments, the one or more sensors 204 can identify, from the frequency, time, and/or the embedded signal of detected light, a particular transmitter of the set of transmitters 202 from which the light was emitted.

The power supply 206 supplies electric power to the device elements, as needed, during the course of their normal operation. The power is supplied to meet the individual voltage and load requirements of the device elements that draw electric current. The power supply also powers up and powers down a device. For a particular embodiment, the power supply includes a rechargeable battery.

The block element 208 represents one or more motion sensors that allow the device 102 to determine movement. In a particular embodiment, the motion sensors 208 include at least one accelerometer or vibration transducer capable of shock and vibration measurements. For other embodiments, the motion sensors 208 can include, but are not limited to: velocity sensors, piezoelectric sensors, gyroscopes, and global positioning system (GPS) receivers. Multiple sensors of a common type can also take measurements along different axial directions. The motion sensors 208 allow the device 102 to determine its motion or velocity, acceleration, and/or higher-order derivatives of position with respect to time.

The non-volatile storage 210 provides the device 102 with long-term storage for applications, data tables, and other media used by the device 102 in performing the methods described herein. For particular embodiments, the device 102 uses magnetic (e.g., hard drive) and/or solid state (e.g., flash memory) storage devices. The memory 212 represents short-term storage, which is purged when a power supply for the device 102 is switched off and the device 102 powers down. In one embodiment, the memory 212 represents random access memory (RAM) having faster read and write times than the non-volatile storage 210.

The block element 218 represents an imager, defined herein as a device configured to capture images. For a particular embodiment, the imager 218 is a camera, such as the camera 104. The imager 218 includes elements needed to capture images of a vicinity of a device and to convert the images to image data that can be processed by the processing element 214 and or the image processing module 216. Image data represents the informational content of an image, independent of its encoded format. The images may represent static images, such as pictures, or kinetic images, such as videos.

In one embodiment, converting images to image data involves converting the images to a digital format that can be stored electronically and transmitted to the processing element 214 and/or the image processing module 216 for processing. Example codec technologies used for image conversion include, but are not limited to, the Joint Photographic Experts Group (JPEG) standard for pictures and the Moving Picture Experts Group (MPEG) standard for videos. Limitations, such as the focal length and the resolution of a lens used by a camera, for example, determine the effective range for which useful image data can be obtained. Useful image data is data that can be used by a GRS to determine a gesture. A context of operation for the device 102 can represent additional limitations for obtaining useful data from the imager 218. For example, the imager 218 may be unable to capture a useful image in low light conditions. Descriptions of particular contexts of operation and the limitations they represent are provided with reference to FIG. 4.

The image processing module 216 represents computational resources used in processing image data used for gesture recognition. The image processing module can include one or more processing cores. In one embodiment, the image processing module 216 is co-located, in whole or in part, with the processing element 214. In another embodiment, the one or more processing cores of the image processing module 216 are configured as a separate processing unit, such as a graphics processing unit (GPU), dedicated to processing the image data provided by the imager 218.

The block element 220 represents a photosensor configured to measure a level of ambient light. For a particular embodiment, the photosensor 220 represents the light meter 116, which can provide the device 102 with an indication of how effective the imager 218 will be at capturing useful images given the ambient light level.

In an embodiment, the imager 218, the image processing module 216, and the processing element 214 operate collectively as an image-based GRS. The image-based GRS, which may include additional elements not shown at 200, allows a device, such as device 102, to perform a gesture recognition function on gesturing input collected by the device while using an imager. A gesture, as used herein, is an expression of intent made by a user of the device with the motion, position, or configuration of a body part or an implement held by a body part. If the user intends for the device to perform a particular preprogrammed operation, the user makes a gesture programmed to trigger that operation.

Using the imager 218, the device captures one or more images of the gesture as gesturing input, processes the input to identify the gesture, and performs the programmed operation. The device retains the one or more images in memory 212 as the image processing module 216 compares objects within the images against a database of programmed gestures. The image processing module 216 identifies motion-based gestures by using multiple images and comparing the relative position of an object, such as the user's right hand, captured at different moments in time. For some embodiments, the image processing module 216 determines if an object is moving toward or away from the imager 218 by analyzing how the size of the object's images changes in successive "snapshots." In other embodiments, the image processing module 216 determines the distance of an object from the imager 218 and/or how that distance is changing by using an autofocus function of the imager 218. A larger focal length is needed, for example, to bring a more distant object into focus.

The imager 218 is capable of image resolutions sufficient to enable the image processing module 216 to identify preprogrammed gestures from the captured images. Additionally, the image processing module 216 is capable of processing speeds that allow it to process the images and identify gesture-based commands in real time. Capturing, storing, and processing high-resolution images in this way comes with a power-consumption cost.

A more energy efficient means of performing the gesture recognition function involves a device receiving gesturing input without using the imager 218. For the device represented by the elements 200, the infrared transmitters 202, the infrared sensor 204, and the processing element 214 operate collectively as a non-image-based GRS, which does not rely on image data. Instead, the infrared sensor 204 receives gesturing input as light emitted by the infrared transmitters 202 is reflected back toward the device from an object used to perform a gesture. Determining gestures in this way, without the use of the imager 218, limits the number and type of gestures that the device can detect and identify. For example, a user can adjust the volume while listening to music on a device using the image-based GRS by simply holding up four fingers. The device identifies the gesture and changes its volume setting to "4." Because of the complexity of gestures involving individual figures, the user might adjust the volume up or down when the device is using the non-image-based GRS by instead moving a hand up or down, respectively, in front of the infrared sensor 204. A further description of the gesture recognition function as performed by the non-image-based GRS is provided with reference to FIG. 5.

Figure 3:
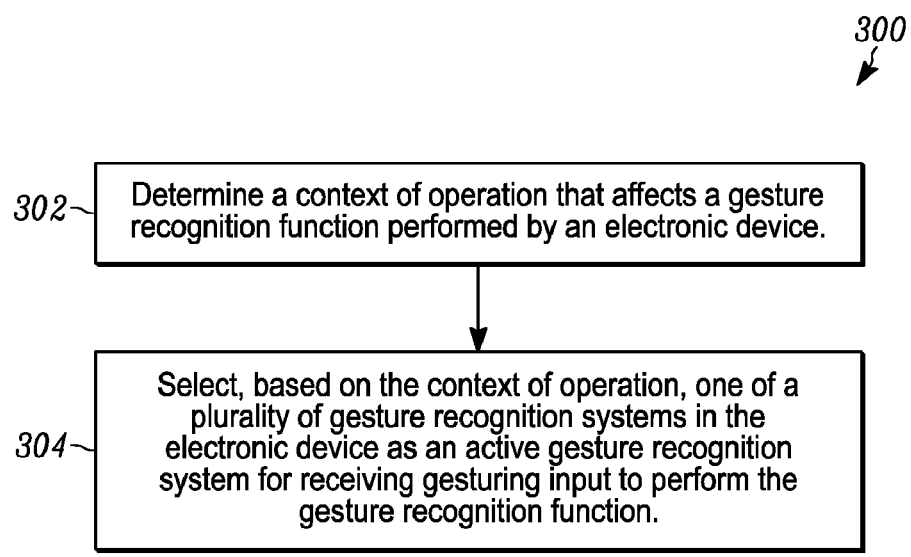
FIG. 3 is a logical flowchart of a method for selecting a GRS in accordance with some embodiments of the present teachings.

We turn now to a detailed description of the functionality of the device 102 and device elements shown in FIGS. 1 and 2 at 102 and 200, respectively, in accordance with the teachings herein and by reference to the remaining figures. FIG. 3 is a logical flow diagram illustrating a method 300 performed by a device, taken to be device 102 for purposes of this description, for selecting between multiple GRSs. The method includes the device 102 determining 302 a context of operation for itself.

A context of operation, as used herein, is defined as one or more circumstances or conditions that relate to, affect, or are a consequence of the operation of at least one of the multiple GRSs the device 102 selects between. In a first example, if one of the GRSs the device 102 selects between uses an imager 218 that needs ambient light to capture an image, then an ambient light level is a context of operation because it affects the operation of at least one GRS. In a second example, if one GRS the device 102 selects between consumes more power than another, then power consumption is a context of operation because it is a consequence of the operation of at least one GRS. A context of operation, as defined herein, also includes modes of operation or the operational status of the device 102, such as when the device 102 is running a particular program or charging while connected to a charger, for example. Based on the context of operation, the device 102 selects 304 one of the multiple GRSs it is equipped with as an active GRS. Both of these examples are described in more detail below with reference to FIG. 4.

The active GRS is the one the device 102 utilizes for receiving gesturing input and performing the gesture recognition function. For an embodiment, the processing element 214 selects, using an algorithm, the active GRS based on weighing a context that affects the performance of the GRS against the need for a type of processing performed by the GRS. Low light conditions, for example, might weigh against using an image-based GRS while a program running on the device 102 might perform best using the types of gestures the image-based GRS is configured to process.

Figure 4:
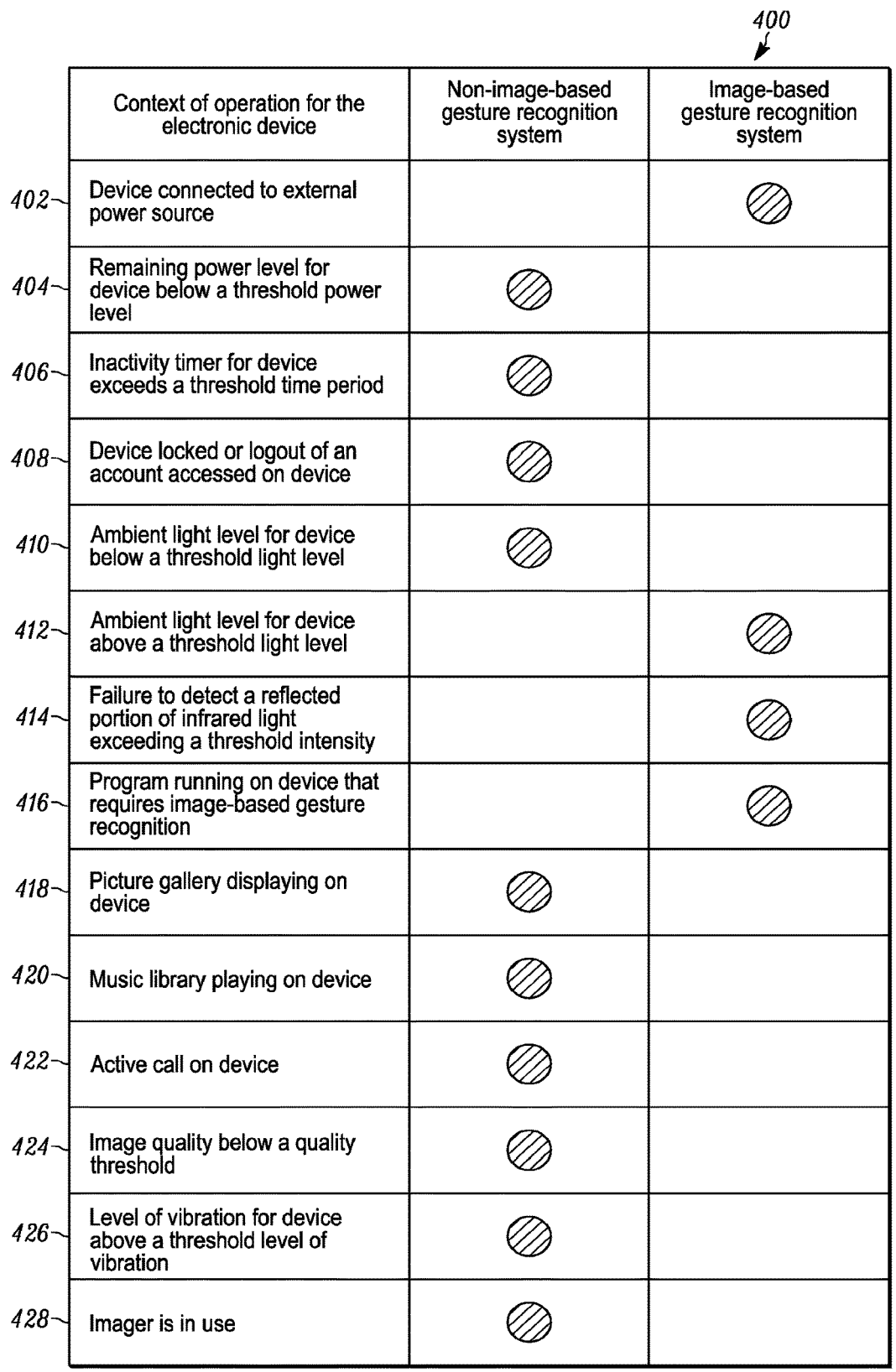
FIG. 4 is a table showing the active GRS selected for different contexts of operation in accordance with some embodiments of the present teachings.

Presented in FIG. 4 is a table 400 showing the active GRS for fourteen different contexts of operation. The fourteen different contexts of operation indicated in table 400 do not represent an exhaustive list. Other embodiments include additional contexts of operation. Further, some contexts of operation not shown include multiple circumstances or conditions that relate to, affect, or are a consequence of the operation of one or more GRSs the device 102 selects between. These multi-condition contexts of operation are referred to herein as compound contexts of operation and are described in more detail below. The first column of table 400 indicates a context of operation as determined by the device 102. The second and third columns represent a non-image-based GRS and an image-based GRS, respectively. For the embodiments shown at 400, these two GRSs represent the multiple GRSs from which the device 102 selects an active GRS. Each row of table 400 indicates which GRS the device 102 selects given the context of operation specified for that row.

For the embodiment indicated at 402, the device 102 determines it is connected to an external power source and selects the image-based GRS as the active GRS. This selection is based on the image-based GRS being able to recognize both more gestures and more complex gestures than the non-image-based GRS. If the device 102 detects that it is connected to a charger or a docking station that supplies power, for example, the high power consumption of the image-based GRS is given less weight by a selection algorithm run by the processing element 214.

If, conversely, the device 102 is running on one or more batteries that have less than a full charge, the greater power consumption of the image-based GRS is given more weight, and the device 102 selects the non-image-based GRS because it consumes less power than the image-based GRS. For the particular embodiment shown at 404, the device 102 determines its remaining power level is below a threshold power level and selects the non-image-based GRS. As defined herein, a threshold is a point of demarcation that must exceeded, or in some cases not met, to elicit a response. The amount of remaining power available to the device 102 is a context of operation because it relates to the operation of the two GRSs, each of which has a different power consumption rate.

When the device 102 determines an inactivity timer exceeds a threshold time period, the device 102 selects the non-image-based GRS as the active GRS, as indicated at 406. The inactivity timer provides the device 102 with an elapsed time since the last user interaction or the time the device 102 has been idle. As the inactivity time increases, so does the likelihood that a user who was previously using the device 102 is finished doing so. For an embodiment, as the inactivity timer exceeds the preprogrammed threshold time period, the device 102 switches from the image-based to the non-image based GRS to conserve power.

A user logging off or locking the device 102 serves as a stronger indication that the user is finished using the device 102 and that the device 102 will be idle for a period of time. When the device 102 detects that it is locked or a logout of an account that was accessed on the device 102 has occurred, the device 102 selects the non-image GRS as the active GRS, as indicated at 408. The non-image-based GRS conserves power as the device 102 waits for gesturing input that will unlock the device 102 and/or again allow the user to access his account. For one embodiment, the device 102 operates the non-image-based GRS at a lower power level as compared to a normal power level for the non-image-based GRS when the user is actively using the device 102. The lower power level can be achieved by intermittently activating the non-image-based GRS as it is waiting for input, for example, by repeatedly turning the transmitters 202 and sensor 204 off for a first duration of time, and turning them on again for a second duration of time. In a particular embodiment, the non-image-based GRS is cycled on and off every 200 milliseconds until an input gesture is detected. An expected period of inactivity is a context of operation because it relates to the operation of the two GRSs, each of which has different power requirement while operating in an idle mode.

In an embodiment 410 where the device 102 determines that an ambient light level for the device 102 is below a threshold light level, the device 102 selects the non-image GRS as the active GRS due to the high current involved in providing illumination for gesturing in low-light conditions. In a further embodiment, the device 102 includes a photo-sensor 220 configured to determine an ambient light level as the context of operation and the processing element 214 is configured to select the non-image-based GRS as the active GRS when the ambient light level is below the threshold light level. As defined herein, the ambient light level is the light level that exists at the device 102 without illumination being provided by the device 102. Because the imager 218 is dependent on at least a threshold light level to capture images from which gestures can be detected, the device 102 selects the non-image GRS when the ambient light level falls below that threshold. The non-image-based GRS uses the infrared transmitters 202 as a source of illumination and is not adversely affected by low-light conditions.

When the ambient light level is very high, such as when the device 102 is subjected to bright sunlight, the sensor 204 can have difficulty in detecting the infrared light emitted by the transmitters 202. In some instances, the embedded signals created by pulsing the infrared LEDs 202 on and off are "washed away" by a high level of infrared light in the ambient spectrum. For an embodiment 412, when the device 102 determines that an ambient light level for the device 102 is above a threshold light level, the device 102 selects the image-based GRS as the active GRS. In other embodiments, the device 102 is able to directly detect when the non-image-based GRS is not operating optimally. The ambient light level is a context of operation because it affects the operation of the two GRSs, each of which functions best in a different range of light conditions.

If, while the non-image-based GRS is active, the device 102 is expecting gesturing input based on previous input and/or a program that is running on the device 102, and that input is not detected, the device 102 switches to another GRS. For example, the sensor 204 receives infrared light from the transmitters 202 as it reflects off a gesturing object, but the received light signal is too weak or intermittent to perform the gesture recognition function effectively. For a particular embodiment 414, the device 102 selects the image-based GRS as the active GRS when the device 102 fails to detect a reflected portion of the infrared light that exceeds a threshold intensity. Failure to detect a sufficient portion of reflected infrared light is a context of operation because it relates to the operation of the non-image-based GRS, which relies on the sensor 204 detecting a sufficient portion of reflected infrared light to function effectively.

For another embodiment 416, the device 102 determines that a program executing on the device 102 operates using gesturing input that includes a gesture that the non-imagebased GRS is not configured to recognize, and the device 102 selects the image-based GRS as the active GRS. The device 102, being configured for disabled persons, for example, might allow a user to communicate with a friend having a similar device using sign language or another gesture-based method of communication. Because the non-image-based GRS is incapable of processing the complex gestures associated with an image-based method of communication, such as sign language, the device 102 switches to the image-based GRS. As it does so, the icon 120 is emphasized over icon 122, thereby indicating to the user that the image-based GRS is active. A program running on the device 102 that requires image-based gesture recognition is a context of operation because it relates to the operation of the two GRSs, only one of which is capable of image-based gesture recognition.

In one particular embodiment, while the communication program requiring the image-based GRS is running, the camera 104 captures gesturing input from the user of device 102, and the image-based GRS processes the input to ascertain its content. In another embodiment, the device 102 processes gesturing input it receives by comparing the input to a library database of gestures loaded from non-volatile storage 210 into memory 212 when the device 102 is powered on or when the image-based GRS is activated. As each gesture is identified, the corresponding library image is displayed on the user interface 118, as shown at 124, so the user can verify his device 102 is receiving and interpreting his own gestures correctly. Moreover, as indicated earlier, the device 102 could also communicate the content to the device of a friend with whom the user of device 102 is communicating, to be rendered as speech, text, or gesture-based output on the friend's device. For another embodiment, communications received from the friend's device are displayed on the user interface 118 of device 102 as gestures, as indicated at 124.

The specific gesture shown at 124, in which the thumb touches the ring finger, represents the number "7" in American Sign Language (ASL). This gesture can be used by a program running on the device 102 to: adjust a volume, a brightness, or a zoom setting to "7"; to select the 7th row or column of a spreadsheet; or to dial the number "7" when making a call. In other instances, a program running on the device 102 does not benefit from the ability to accept complex gestures as input. This is the case, for example, with programs that only require limited input to function effectively.

Two such programs that require only limited input are an image viewer for displaying a picture gallery and an audio player for listening to a music library. These programs running on the device 102 represent a context of operation because they define a mode of operation of the device 102. More specifically, while the image-based GRS is capable of recognizing more gestures, the non-image-based GRS is capable of recognizing a sufficient number of gestures to allow a user to effectively control the operation of the programs. When the device 102 determines that a picture gallery is being displayed or a music library is being played on the device 102, the device 102 selects the non-image-based GRS as the active GRS, as indicated at 418 and 420, respectively. A picture gallery is a collection of picture files, stored on the device 102 or stored on a memory device (e.g., a Universal Serial Bus (USB) drive or a Secure Digital (SD) card) interfaced with device 102, that can be displayed in succession by the device 102 running an image viewer. Similarly, a music library is a collection of music files, stored on the device 102 or stored on a memory device interfaced with device 102, that can be played in succession by the device 102 running an audio player.

For a particular embodiment, a gesture made by a user moving his hand from left to right in front of the photodiode 114 causes the device 102 to skip forward to the next image in a picture gallery or to the next song in a music library while the user interface 118 is kept off. A user returns to a previous song or image by moving his hand from right to left. By moving his hand upward, the user zooms in on an image being displayed or increases the volume for a song being played. The user can zoom out or lower the volume by moving his hand in a downward direction, and by holding his hand in front of the photodiode 114, the user can pause a song being played. A further description of the types of gestures that can be detected by the non-image-based GRS is provided with reference to FIG. 5.

While a user might gesture while viewing pictures or playing music, he is unlikely to be gesturing while he is taking a call, especially if the device 102 is being held against his ear. Therefore, in an embodiment 422, the device 102 selects the non-image-based GRS as the active GRS when the device 102 detects an active call is in progress. This allows the device 102 to conserve power and still enables it to accept limited gesturing input. An active call on the device 102 represents a context of operation because it relates to the operation of the two GRSs, each of which is capable of recognizing a different number of gestures.

In another embodiment 424, the device 102 determines that image quality is below a quality threshold for performing the gesture recognition function, and the device 102 selects the non-image-based GRS as the active GRS. Poor image quality is a context of operation because it is a consequence of and relates to the operation of the image-based GRS, which is unable to operate effectively if the images it captures are of insufficient quality to determine gestures. Under certain conditions, other than or in addition to a low ambient light level, the imager 218 is unable to capture images of sufficient quality to determine gestures, and the non-image-based GRS is selected. For example, one such condition is motion the device 102 is subjected to. When the set of motion sensors 208 are configured to characterize a motion of the device 102 as the context of operation, the processing element 214 is configured to select the non-image-based GRS as the active GRS when the motion is characterized as a motion that adversely affects performing the gesture recognition function using the image-based GRS.

In one instance, a user running with the device 102 causes the camera 104 to capture blurred images. The motion associated with running includes accelerations and decelerations in the vertical direction as well as intermittent shocks that occur as the user's heels strike the ground. In a first embodiment, the device 102 detects captured images are sufficiently blurred to fall below the quality threshold and consequently switches from the image-based to the non-image based GRS. In a second embodiment, the device 102 detects the motion associated with running as one that will cause blurred mages and consequently switches from the image-based to the non-image based GRS. For an embodiment, the type of motion is detected by the motion sensors 208 and identified by the processing element 214.

In another instance, the device 102 being carried in a boat navigating rough waters at high speed prevents the camera 104 from capturing clear images. The device 102 switches from the image-based to the non-image based GRS based on either determining the captured images are of insufficient quality for, or determining the type of motion is one that adversely affects, performing the gesture recognition function using the image-based GRS.

For a particular embodiment 426, in which the device 102 includes an accelerometer or a vibration transducer configured to determine a level of vibration as the context of operation, the device 102 selects the non-image-based GRS as the active GRS when the level of vibration is above a first threshold level of vibration. In a further embodiment, the device 102 selects the image-based GRS as the active GRS when the level of vibration is below a second threshold level of vibration. As used herein, vibration refers to multiple changes in velocity, acceleration, and/or higher-order derivatives of position with respect to time that occur within a time interval. These changes can be in both magnitude and/or direction, can be abrupt and/or smoothly transitioning, and can be regularly occurring (e.g., footfalls while jogging) and/or unpredictable (e.g., road irregularities, such as potholes, while driving) in nature.

One or more of the motion sensors 208 detects vibration. For a particular embodiment, a piezoelectric sensor takes both vibration and shock measurements. The resulting data is then sent to the processing element 214, which quantifies a level of vibration from it using a programmed algorithm. The algorithm is designed to identify and weigh types of vibration based on how they affect the gesture recognition function as performed by the image-based GRS. If the level of vibration, as quantified by the algorithm, is above the first threshold level of vibration, then the device 102 selects the non-image-based GRS as the active GRS. Conversely, if the level of vibration is below the second threshold level of vibration, then the device 102 selects the image-based GRS as the active GRS. A high level of vibration is a context of operation because it affects the operation of the image-based GRS, which is unable to capture clear images as a consequence of strong vibrations.

For one embodiment 428, the device 102 determining the context of operation includes the device 102 determining that the imager 218 is in use. The imager 218 being in use represents a context of operation because it defines an operation status of the device 102. The device 102 then responsively selects the non-image-based GRS as the active GRS because the non-image-based GRS does not use the imager 218. In an example, a user is using device 102 for video conferencing, which requires the use of the camera 104. The camera 104 represents the imager 218 and is a component of the image-based GRS. While the camera is in use, the device 102 selects the non-image-based GRS as the active GRS to allow the user to continue using gesturing to perform certain tasks, such as making a volume adjustment, without need of the camera 104.

For some embodiments (not shown), the device 102 selects one of a plurality of GRSs as an active GRS based on a compound context of operation. In an embodiment, an algorithm executed on the device 102 determines the selection. The algorithm may be stored in non-volatile storage 210 and loaded into memory 212 when the device 102 is powered on. In one embodiment, the algorithm allows the device 102 to select an active GRS without input from a user of the device 102. In another embodiment, the algorithm makes its determination based upon user input. This user input might include the user selecting a mode of operation. For instance, when a compound context of operation includes both a remaining power level for the device 102 below a threshold power level and an ambient light level for the device 102 above a threshold light level, the device 102 selects the non-image-based GRS if the user has selected a power-saving mode of operation. For the same compound context of operation, the device 102 instead selects the image-based GRS if the user has selected a performance mode of operation.

In another embodiment, the user can force a selection of an active GRS by tapping the image-based 120 or the non-image-based 122 GRS icon on the display 124. The user's choice represents a context of operation because it relates to the operation of a GRS in the device 102, specifically which GRSs will operate as the active GRS.

Figure 5:
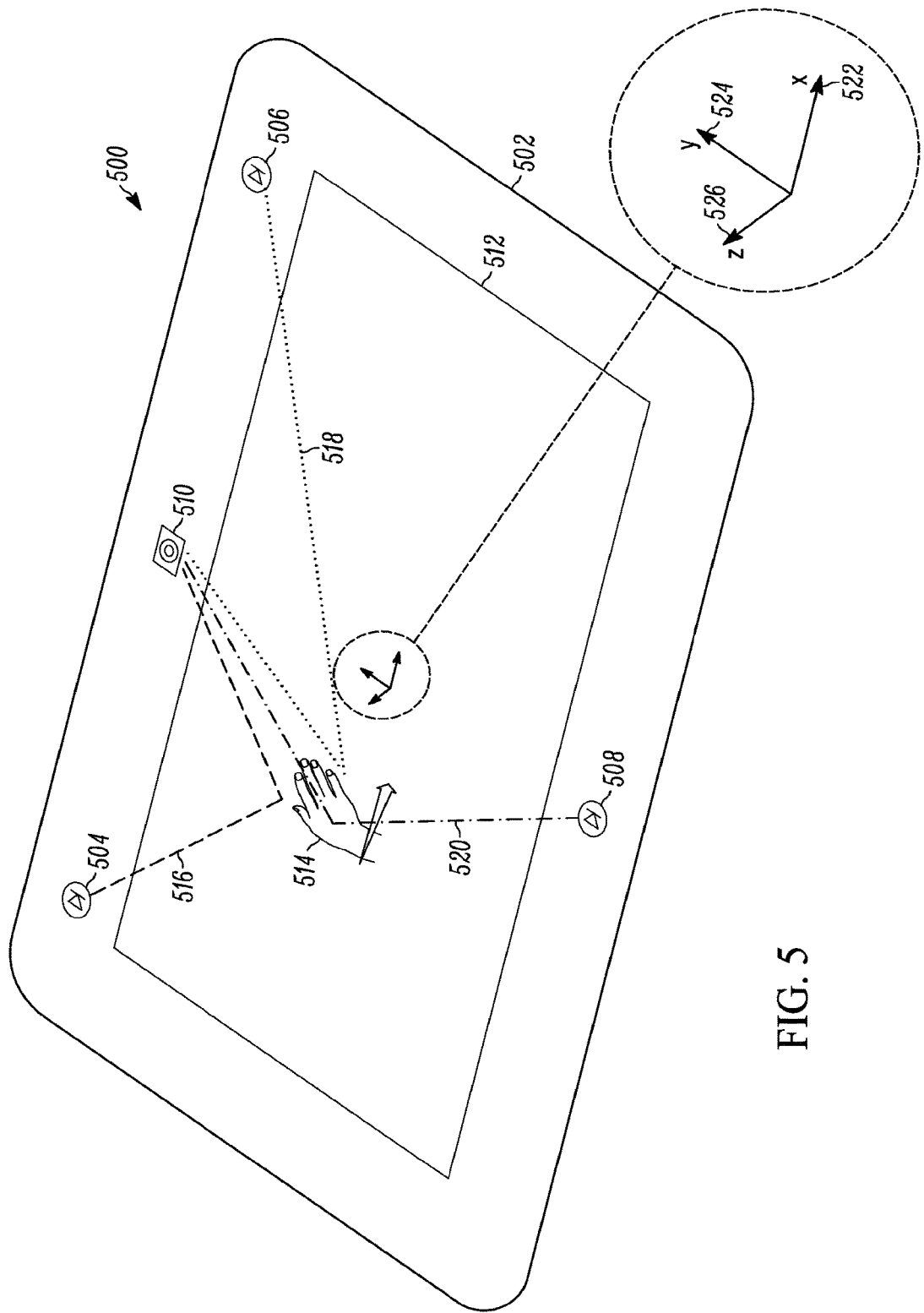
FIG. 5 is a schematic diagram illustrating the operation of a non-image-based GRS in accordance with some embodiments of the present teachings.

A schematic diagram illustrating the operation of the non-image-based GRS in accordance with an embodiment of the present teachings is shown in FIG. 5 at 500. The non-image-based GRS includes a set of one or more infrared transmitters 504-508 configured to transmit infrared light, and a set of one or more infrared sensors 510 configured to receive the transmitted infrared light when the light is reflected from an object 514 in proximity to an electronic device 502. As used herein, an object in proximity to a device, or an object proximal to a device, is an object within a distance of the device that allows the non-image-based GRS to detect the object. More specifically, the non-image-based GRS shown at 500 is integrated into a tablet computer 502 and includes a plurality of infrared light-emitting diodes 504-508, each light-emitting diode having a different location on the electronic device 502, and each light-emitting diode configured to transmit infrared light with an embedded signal that distinguishes light transmitted from that light-emitting diode from light transmitted by other light-emitting diodes of the plurality of light-emitting diodes 504-508. The non-image-based GRS shown at 500 also includes a single photodiode 510 sensitive to infrared light, the photodiode 510 configured to distinguish between reflected infrared light received from different light-emitting diodes of the plurality of light-emitting diodes 504-508 based on the embedded signal of the infrared light received by the photodiode 510.

As shown at 500, light from the first LED 504 is pulsed on and off to create a first embedded signal, specifically a "dash-dash-dash" signal. Similarly, light from the second 506 and third 508 LEDs is pulsed to create a "dot-dot-dot" and a "dash-dot-dash" signal, respectively. As a user's hand 514 sweeps from left to right in front of the tablet 502, infrared light from the three LEDs 504-508 is reflected from the hand and received by the photodiode 510. Because the hand 514 is closer to the first LED 504 than the second LED 506, the total distance light travels to be received by the photodiode 510 is shorter for light emitted by the first LED 504 as compared to light emitted by the second LED 506. Therefore, light emitted by the first LED 504 is received at the photodiode 510 with greater intensity as compared to light emitted by the second LED 506. The device 502, using a processing element (e.g., processing element 214), determines a relative or absolute intensity for the light received at the photodiode 510 from each of the three LEDs 504-508. By associating each intensity with a particular LED using the embedded signals, the device 502 "triangulates" a position for the hand 514.

As the hand 514 continues moving to the right, the intensity of light the photodiode 510 receives from the first LED 504 decreases as the intensity of light it receives from the second LED 506 increases. In this way, the device 502 is able to detect motion using the non-image-based GRS. For an embodiment in which the hand 514 is moving directly toward or away from the device 502 along a line centered between the three LEDs 504-508 and perpendicular to the plane they define, the ratios of intensities remains the same as the hand 514 moves because the three path lengths of light share a common (albeit changing) value. In this case, the tablet 502 is able to make inferences about the distance of the hand and the direction in which it is moving from analyzing the absolute intensity of light received from the LEDs 504-508 and how that intensity is changing.

In an alternate embodiment, the embedded signal transmitted by each LED has the same pattern, "dot-dot-dot," for example. Each LED, however, transmits light of a different color or frequency. A light sensor, such as the photodiode 510, can differentiate between the different colors of light, by using an electronic discriminator, for example, to determine from which LED each detected light transmission originated.

In another embodiment, the set of infrared transmitters 202 comprises a plurality of infrared LEDs, such as the LEDs 504-508, each having a different location on a device, such as the tablet 502. Each LED is configured to transmit the same pulse or frequency of infrared light as the other LEDs. Each LED, however, transmits its light at a different time from the other LEDs, such that only one LED is transmitting at a time. By using a time division multiple access (TDMA) method, the set of infrared sensors 204 can identify from which LED each light transmission originated because each LED uses a different time slot for transmission.

In a further embodiment that includes the use of the TDMA method, the set of one or more infrared sensors 204 comprises a single infrared sensor, such as infrared sensor 510. The single infrared sensor 510 is configured to distinguish between the reflected infrared light 516-520 received from the LEDs 504-508, respectively, based on different time slots used by each LED rather than a different signal used by each LED.

For particular embodiments, the tablet 502 is configured to distinguish between at least two positions of a proximal object along each of three mutually perpendicular axes, and/or detect bidirectional motion of a proximal object along each of three mutually perpendicular axes. The three mutually perpendicular axes might include, for example, a first or "x" axis aligned horizontally along a user interface 512 of the tablet 502, a second or "y" axis aligned vertically along the user interface 512 of the tablet 502, and a third or "z" axis aligned horizontally and perpendicular to the user interface 512 of the tablet 502, with the three axes intersecting at the center of the tablet's user interface 512. In a first embodiment, the non-image-based GRS included within the tablet 502 can determine if the hand 514 is positioned near the left side of the tablet's user interface 512 ($x<0$), near its right side ($0<x$), near its bottom ($y<0$), near its top ($0<y$), just above it ($z=z_o$), or farther away ($z_o<z$). In further embodiments, the non-image-based GRS can distinguish between more than two positions along one of more of the three mutually perpendicular axes. This is done by analyzing the absolute and relative light intensities.

In a second embodiment, the non-image-based GRS can distinguish between directions of motion along each of the three mutually perpendicular axes. This includes the non-image-based GRS determining whether the hand 514 is moving left to right, right to left, top to bottom, bottom to top, toward the user interface 512, or away from the user interface 512. For a particular embodiment, the non-image-based GRS recognizing these six motions in addition to the hand 514 being held stationary in front of the tablet 502, allows the non-image-based GRS to process seven distinct gestures than can be used to interact with the tablet 502. In other embodiments, the non-image-based GRS is configured to mimic the function of popular interfaces through the use of gestures.

Figure 6:
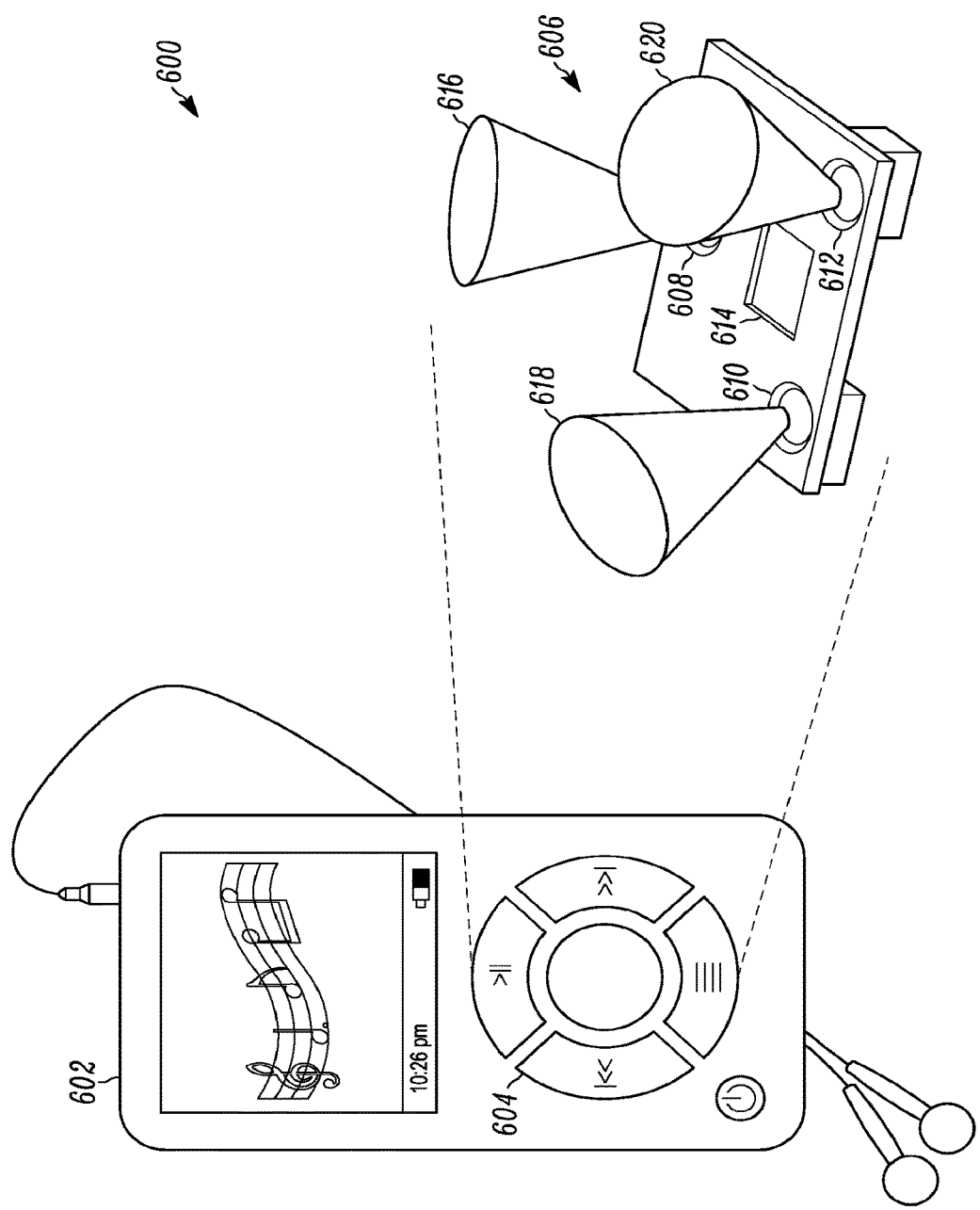
FIG. 6 is a schematic diagram illustrating the operation of a non-image-based GRS in accordance with some embodiments of the present teachings.

FIG. 6 shows a schematic diagram 600 of a media player 602 that includes a classic-style 5-way navigation interface 604, which is found on some electronic devices. Also shown in the diagram 600 is a non-image-based GRS 606 configured as a modular unit. The unit 606 includes three infrared LEDs 608-612 and a photodiode 614 operating as an infrared sensor. For an embodiment, the unit 606 is substituted for the five navigation keys 604 at a time of manufacturing. This creates five virtual keys over which a user can position his thumb to navigate on the media player 602 without actually touching it.

In a further embodiment, the three infrared LEDs 608-612 are configured to direct their emitted light away from one another, as indicated by the cones 616-620. This allows the closely spaced LEDs 608-612 to achieve better spatial resolution at larger distances while still being able to simulate the dimensions of the classic-style interface 604 at closer distances.

Figure 7:
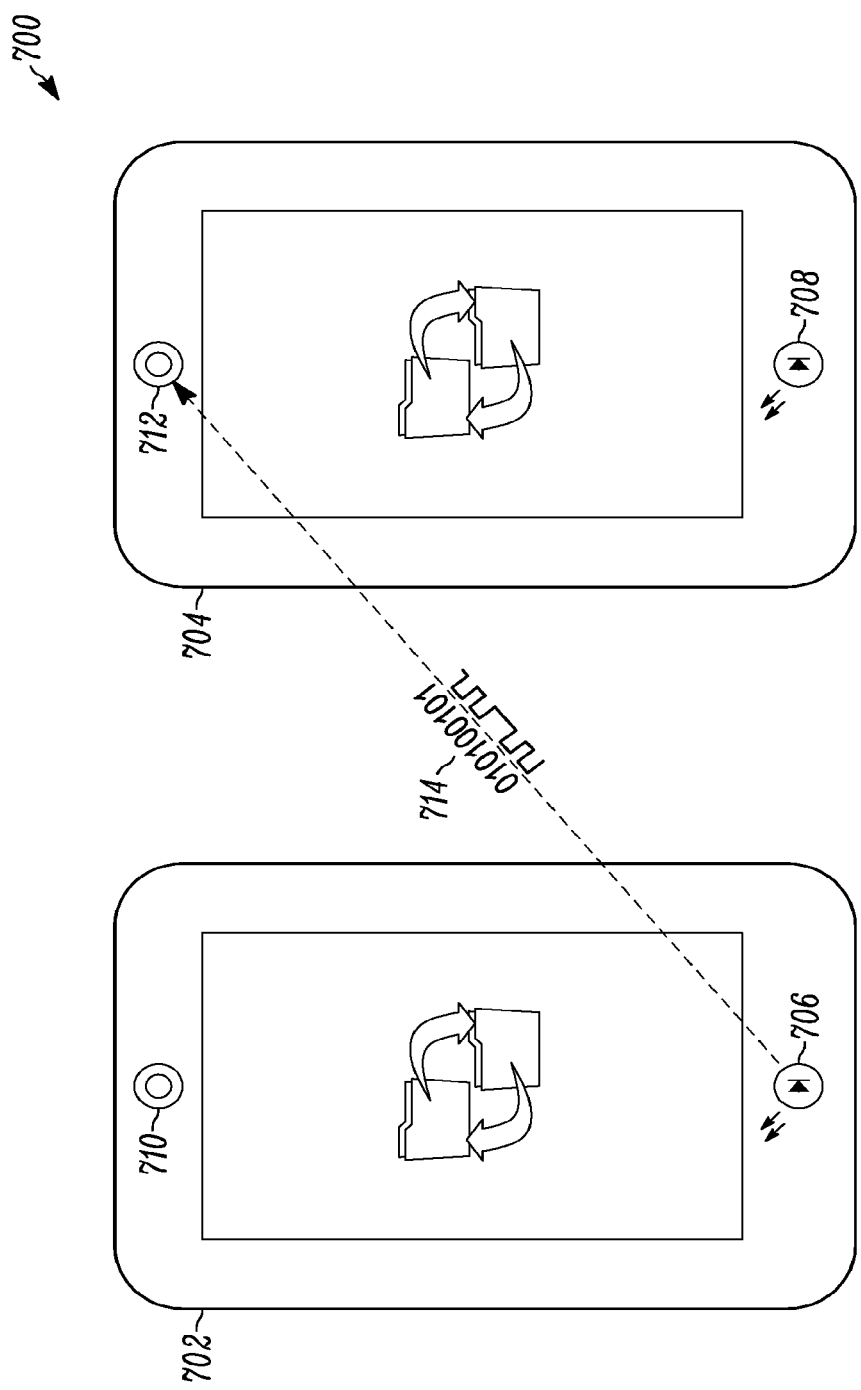
FIG. 7 is a schematic diagram illustrating the operation of a non-image-based GRS in accordance with some embodiments of the present teachings.

Two devices each equipped with a non-image-based GRS can also exchange data with one another. This is illustrated in FIG. 7 by the schematic diagram 700. The diagram 700 shows two electronic devices 702, 704, which in an embodiment are smartphones, using non-image-based GRSs to transfer a file between them. Indicated on the first device 702 is an infrared transmitter 706 and an infrared sensor 710. The second device 704 also includes an infrared transmitter 708 and an infrared sensor 712. For an embodiment, the first device 702 determines it is to exchange data with the second device 704. The determination might be made, for example, when a user of the first device 702 launches a data transfer application. Given this context of operation, the first device 702 selects its non-image-based GRS as its active GRS to facilitate the exchange of data. The first device 702 exchanges data with the second device 704 by performing at least one of: using its infrared transmitter 706 to transmit data to the second device 704, or using its infrared sensor 710 to receive data from the second device 704.

In a first example, the transfer of data is in a single direction, such as when a picture is being sent to device 704 and no response is expected. The diagram 700 shows the two devices 702, 704 while the first device 702 is transmitting data to the second device 704. In a second example, the second device 704 also sends data back to the first device 702. This might be done as a method of error correction. In this case, the infrared sensor 710 of the first device 702 receives infrared light with an embedded data signal from the infrared transmitter 708 of the second device 704.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for detecting gestures, the method comprising:
    causing one or more user interface elements to be presented on a display of a user device, wherein the one or more user interface elements provide a selection between an image-based gesture recognition system and a non-image-based gesture recognition system as an active gesture recognition system for receiving input to perform one or more gesture recognition functions; and
    in response to receiving the selection of the non-image-based gesture recognition system as the active gesture recognition system:
        receiving, at a first time point, via a sensor associated with the user device, a first signal that indicates a position of an object;
        receiving, at a second time point, via the sensor associated with the user device, a second signal that indicates an updated position of the object;
        determining, based on the first signal and the second signal, a motion of the object;
        identifying a gesture of a plurality of gestures based on the motion of the object;
        identifying an action to be performed on the user device that corresponds to the gesture of the plurality of gestures; and
        causing the action to be performed on the user device.

2. The method of claim 1, wherein the first signal that indicates the position of the object indicates a reflection on the object of a transmission from a transmitter associated with the user device.

3. The method of claim 1, further comprising:
    receiving, at the first time point, via the sensor associated with the user device, a third signal that indicates a position of a second object;
    receiving, at the second time point, via the sensor associated with the user device, a fourth signal that indicates an updated position of the second object; and
    determining a relative motion between the object and the second object based on the third signal and the fourth signal, wherein identifying the gesture of the plurality of gestures is based on the relative motion between the object and the second object.

4. The method of claim 1, wherein the action to be performed is adjusting a volume of the user device.

5. The method of claim 1, wherein the object is a finger of a user of the user device.

6. The method of claim 1, wherein identifying the gesture of the plurality of gestures comprises:
    determining a direction of the motion of the object; and
    identifying the gesture of the plurality of gestures based on the direction of the motion of the object.

7. A system for detecting gestures, the system comprising:
    a sensor; and
    a hardware processor coupled to the sensor, wherein the hardware processor is configured to:

cause one or more user interface elements to be presented on a display of a user device, wherein the one or more user interface elements provide a selection between an image-based gesture recognition system and a non-image-based gesture recognition system as an active gesture recognition system for receiving input to perform one or more gesture recognition functions; and in response to receiving the selection of the non-image-based gesture recognition system as the active gesture recognition system:
  receive, at a first time point, via the sensor, a first signal that indicates a position of an object;
  receive, at a second time point, via the sensor, a second signal that indicates an updated position of the object;
  determine, based on the first signal and the second signal, a motion of the object;
  identify a gesture of a plurality of gestures based on the motion of the object;
  identify an action to be performed that corresponds to the gesture of the plurality of gestures; and
  cause the action to be performed on the user device.

8. The system of claim 7, wherein the first signal that indicates the position of the object indicates a reflection on the object of a transmission from a transmitter associated with the user device.

9. The system of claim 7, wherein the hardware processor is further configured to:
  receive, at the first time point, via the sensor associated with the user device, a third signal that indicates a position of a second object;
  receive, at the second time point, via the sensor associated with the user device, a fourth signal that indicates an updated position of the second object; and
  determine a relative motion between the object and the second object based on the third signal and the fourth signal, wherein identifying the gesture of the plurality of gestures is based on the relative motion between the object and the second object.

10. The system of claim 7, wherein the action to be performed is adjusting a volume of the user device.

11. The system of claim 7, wherein the object is a finger of a user of the user device.

12. The system of claim 7, wherein identifying the gesture of the plurality of gestures comprises:
  determining a direction of the motion of the object; and
  identifying the gesture of the plurality of gestures based on the direction of the motion of the object.

13. A non-transitory computer-readable medium containing computer-executable instructions that, when executed by a processor, cause the processor to perform a method for detecting gestures, the method comprising:
  causing one or more user interface elements to be presented on a display of a user device, wherein the one or more user interface elements provide a selection between an image-based gesture recognition system and a non-image-based gesture recognition system as an active gesture recognition system for receiving input to perform one or more gesture recognition functions; and in response to receiving the selection of the non-image-based gesture recognition system as the active gesture recognition system:
    receiving, at a first time point, via a sensor associated with the user device, a first signal that indicates a position of an object;
    receiving, at a second time point, via the sensor associated with the user device, a second signal that indicates an updated position of the object;
    determining, based on the first signal and the second signal, a motion of the object;
    identifying a gesture of a plurality of gestures based on the motion of the object;
    identifying an action to be performed on the user device that corresponds to the gesture of the plurality of gestures; and
    causing the action to be performed on the user device.

14. The non-transitory computer-readable medium of claim 13, wherein the first signal that indicates the position of the object indicates a reflection on the object of a transmission from a transmitter associated with the user device.

15. The non-transitory computer-readable medium of claim 13, wherein the method further comprises:
  receiving, at the first time point, via the sensor associated with the user device, a third signal that indicates a position of a second object;
  receiving, at the second time point, via the sensor associated with the user device, a fourth signal that indicates an updated position of the second object; and
  determining a relative motion between the object and the second object based on the third signal and the fourth signal, wherein identifying the gesture of the plurality of gestures is based on the relative motion between the object and the second object.

16. The non-transitory computer-readable medium of claim 13, wherein the action to be performed is adjusting a volume of the user device.

17. The non-transitory computer-readable medium of claim 13, wherein the object is a finger of a user of the user device.

18. The non-transitory computer-readable medium of claim 13, wherein identifying the gesture of the plurality of gestures comprises:
  determining a direction of the motion of the object; and
  identifying the gesture of the plurality of gestures based on the direction of the motion of the object.

* * * * *